March 22, 1949.  P. P. LUTZ  2,465,244
TRAILER LIFT
Filed June 19, 1947  4 Sheets-Sheet 1
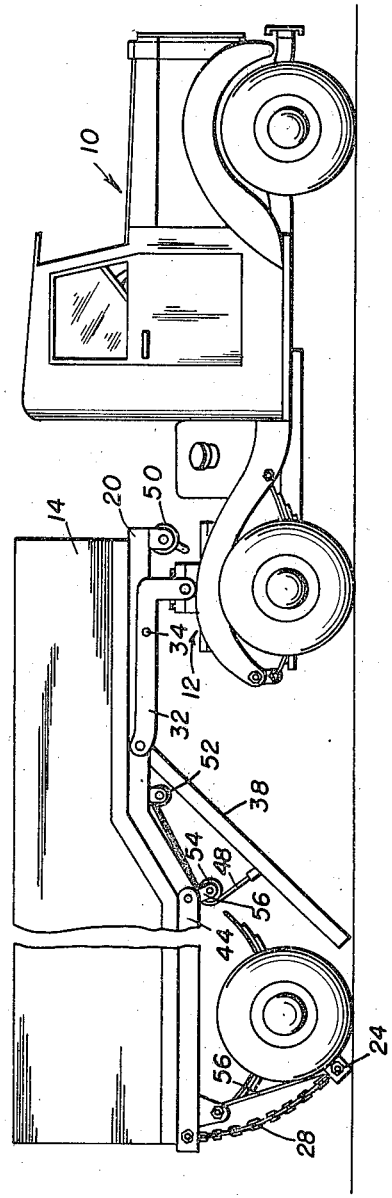
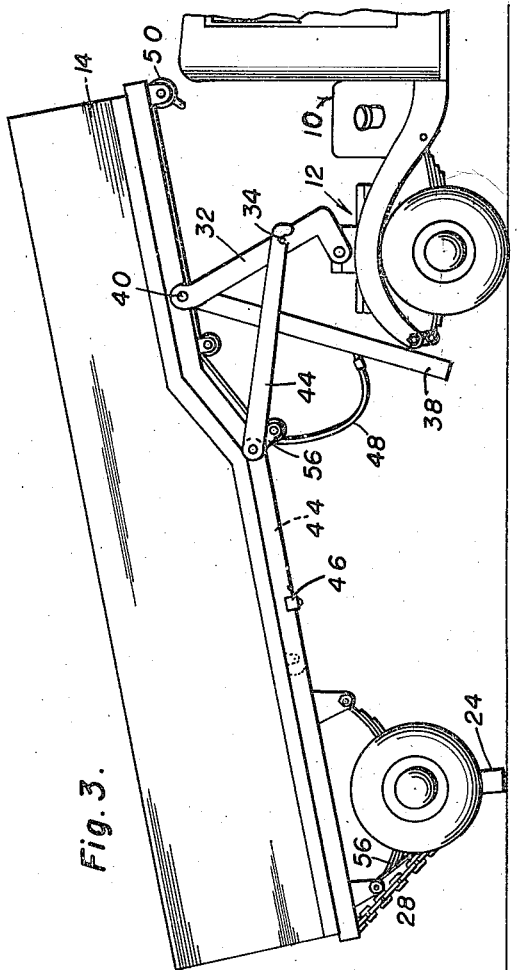
Inventor
Paul P. Lutz
By *Clarence A. O'Brien and Harvey B. Jacobson*
Attorneys March 22, 1949.                P. P. LUTZ                2,465,244
                              TRAILER LIFT
Filed June 19, 1947                                   4 Sheets-Sheet 2
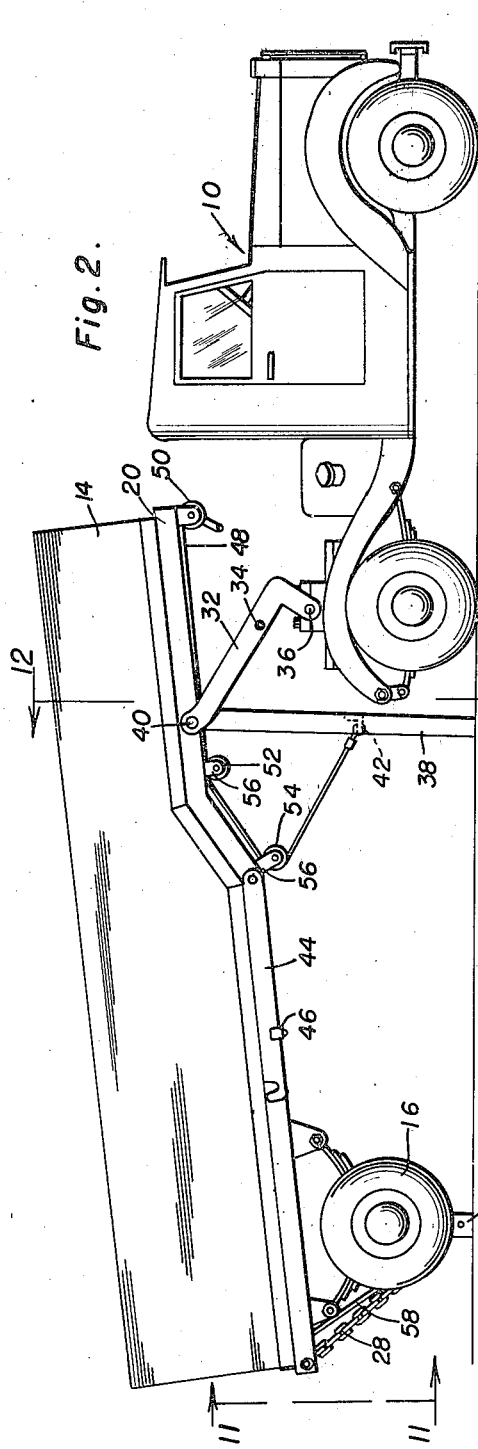
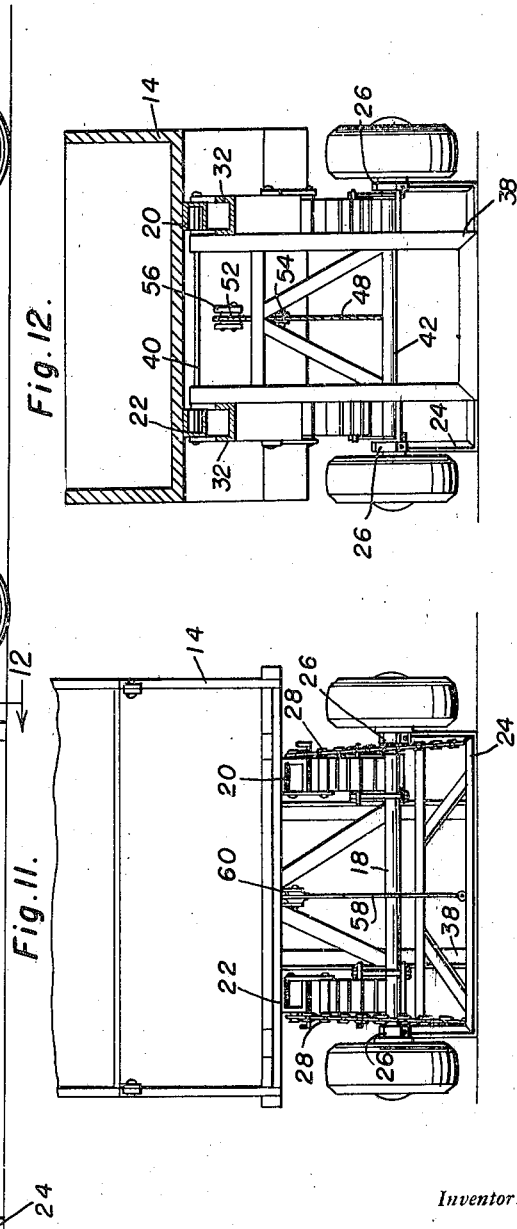
Inventor.
Paul P. Lutz
By *Clarence A. O'Brien*
and *Harvey B. Jacobson*
                         Attorneys March 22, 1949. P. P. LUTZ 2,465,244
TRAILER LIFT
Filed June 19, 1947 4 Sheets-Sheet 3

Inventor
Paul P. Lutz
By *Clarence A. O'Brien and Harvey B. Jacobson*
Attorneys

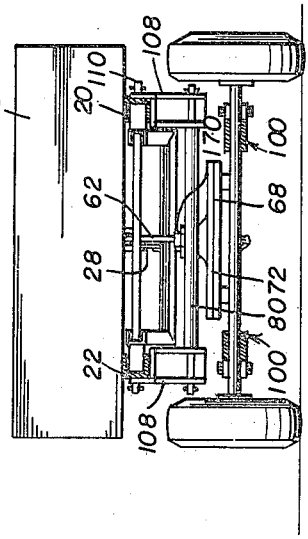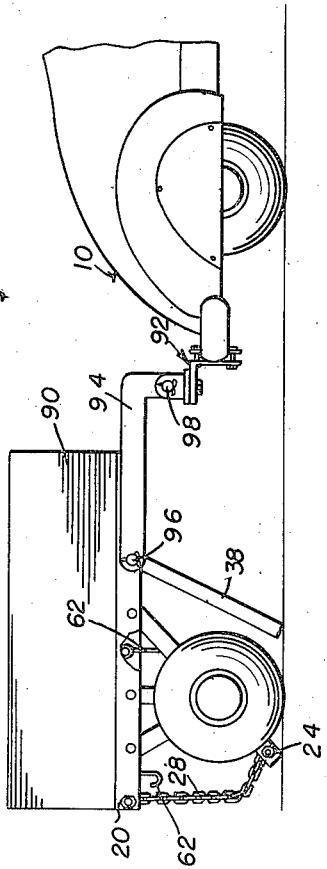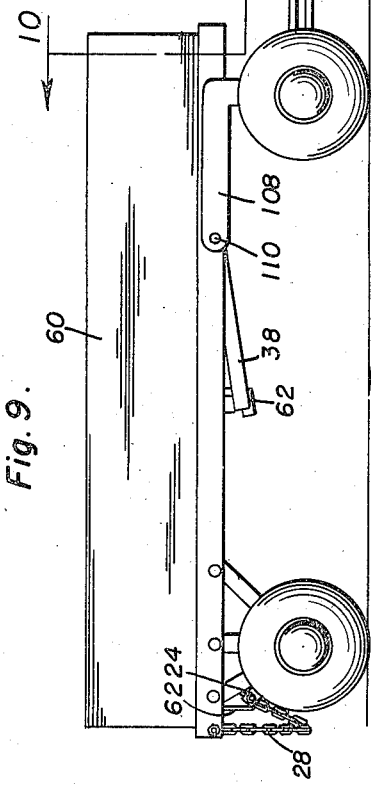

Patented Mar. 22, 1949

2,465,244

UNITED STATES PATENT OFFICE 2,465,244

TRAILER LIFT

Paul P. Lutz, Greenfield, Ind.

Application June 19, 1947, Serial No. 755,806

7 Claims. (Cl. 298—20)

This invention appertains to novel and useful improvements in trailer devices and more specifically means for lifting, dumping and retaining the said trailer in a selected position.

An object of this invention is to lift a trailer and retain the same in the lifted position.

Another object of this invention is to provide means for lifting the rear portion of a trailer due to the reverse operation of a tractor.

A further object of this invention is to provide means for lifting the forward end of the trailer also due to the reverse actuation of a tractor.

A further object of this invention is to provide means for retaining the above mentioned lifting means in the desired inoperative position.

A still further object of this invention is to provide means for locking selected lifting means in the operative position.

Still another purpose of this invention is to provide cam means, assisting in the lifting operation.

Another purpose of this invention is to provide an extremely simple, inexpensive lifting device, obviating expensive hydraulic mechanism as well as the majority of gears utilized in conventional devices of this nature.

Other objects and features of novelty shall become apparent to those skilled in the art, and following the description of the preferred embodiment of the present invention, illustrated in the accompanying drawings, wherein:

Figure 1 is an elevational side view of the first form of the present invention;

Figure 2 is an elevational side view of the third form of the present invention, showing the same in a second cycle of operation;

Figure 3 is an elevational side view of the first form of the present invention, showing the same in another position of the normal operation thereof;

Figure 8 is an elevational view of the third form of the present invention;

Figure 9 is a side view of the fourth form of the present invention;

Figure 10 is a sectional view taken substantially on the line 10—10 of Figure 9 and in the direction of the arrows;

Figure 11 is an end view of the first form of the present invention taken substantially in the direction indicated by 11—11 in Figure 2, and;

Figure 4:
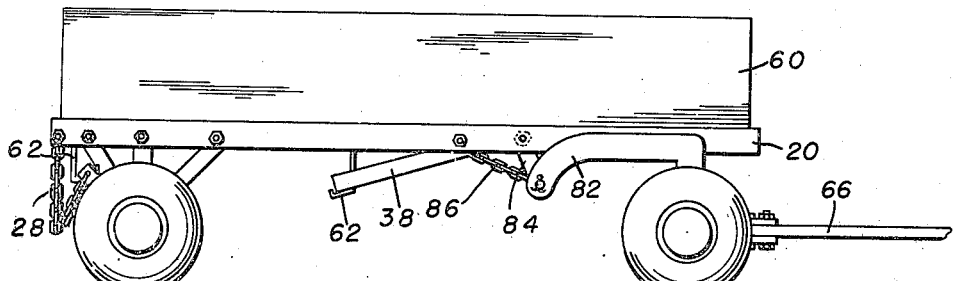
Figure 4 is an elevational view of the second form of the present invention.

F'gure 12 is a sectional view of the invention disclosed in Figure 2 and taken substantially on the line 12—12 thereof and in the direction of the arrows.

Referring now in detail to the illustrated preferred embodiment of the present invention, like reference characters are used throughout to indicate similar elements.

Taking the first embodiment of the present invention, illustrated in Figures 1, 2, 3, 11 and 12, there is disclosed a tractor generally indicated at 10, having the usual pertinent elements associated therewith. A conventional disc type towing element is provided on the tractor for the usual purpose of securing a trailer thereto.

A trailer body 14 is provided for use in association with the present invention. Of course, it may be noted from an inspection of the figures that the illustrated trailer is the suspension type having rear wheels 16 at the terminal portions of an axle 18, which in turn is secured through the medium of conventional springs to truck frame members 20 and 22 respectively.

A stand 24 composed of suitable metallic members is provided with bearings 26 at selected ends thereof. These bearings engage the axle 18 thereby rendering the support pivotal about the axle of the trailer. Chain means 28 is secured to the said support 24 and to the channel members 20 and 22. Obviously, this chain means limits the travel of the support 24 about the axle 18 as a center.

The forward end of the trailer 14 is engageable with the coupling 12. Links 32 are pivoted to the channel members 22 and 24 respectively and suitable strengthening members 34 may be utilized, if so desired. The opposite ends of the said links 32 are received in pivotal relation with the coupling 12 through the medium of a suitable linkage bore shaft 36.

A second support member 38 is pivoted to the channel members 20 and 22 respectively and this last mentioned support is pivoted to a pivot pin 40 which is also common to the linkage member 32. Suitable tie members 42 may be utilized in conjunction with the support 38 for strengthening purposes.

Means for locking the linkage members 32 in a selected position is provided. The means is preferably simple latches 44 which are pivoted to the channel members 20 and 22 respectively. These latches are preferably retained by some suitable, resilient clip 46 which may be also secured to the channel members. When the trailer is lifted in the desired position, the latches 44 may be pivoted to the desired position and locked in the terminal portion of the strengthening member 34. For this construction, reference is made to Figure 3.

There is provided means for lifting the supports 24 and 38 to the inoperative position and retain the same in that position. The retaining means utilized in conjunction with the first embodiment of the present invention is simply a series of cables secured to appropriate pulleys and the appropriate elements. Cables 48 are secured to an appropriate ratchet locking drum 50 which is conventional in structure. The drum 50 is preferably secured to the channel members 20 and 22 and the said cable means 48 extend through suitable pulleys 52 and 54 which are secured to conventional brackets 56. The cable means 48 terminate at the tie members 42. A second cable means extends from the said drum 50 and terminates at the rear support 24. This cable 58 may be secured to the lower portion of the said rear support 24 through the medium of a conventional eye construction and also, the said cable 58 may extend through a suitable supported pulley 60, maintained on the under surface of the said trailer 14. It is quite obvious from an inspection of Figure 2 that upon rotation of the said drum means 50, the front and rear supports may be wound to a position beneath the undercarriage of the invention.

The general operation of the first form of the present invention is extremely similar to the operation of the other three forms. When the truck and tractor are positioned in the approximate desired location, the rear support 24 may be lowered and then, the tractor urges the truck body member backward until the travel of the rear support 24 is impeded by means of the above described chain 28. At this point, the support 24 acts as a brake. At the same time however, the forward support 38 was also engaging the ground thereby lifting the forward portion of the trailer truck also. If it is desired to lift the trailer member 14 even higher, all that is necessary is to simply operate the tractor 10 in a reverse direction, the trailer 14 reacting on the brake means 24 simply lifts the said trailer 14 as is seen in Figure 3. At this point, the latching means 44 may be utilized for retaining the trailer 14 in the raised position.

Going now to the second embodiment of the present invention reference is made to Figures 4, 5, 6 and 7. This embodiment of the present invention may be utilized with any conventional towing tractor. Certain elements utilized in this embodiment of the invention are identical to elements used in the first embodiment and accordingly, similar reference characters will be utilized. The rear wheel assemblage is identical to that of the first embodiment having the same chain means 28 and support 24. It may be noted that the second embodiment of the present invention may be utilized to great advantage on farms and the like wherein a conventional tractor may be employed in towing this form of the invention. A trailer body 60 is provided with channel members 20 and 22 respectively and a forward support 38 is also associated therewith. Hook means 62 of any suitable variety such as the swiveling or pivotal type may be secured to the undercarriage of the truck body member 60. Of course, the said hook means supplant the cable means of the first embodiment of the invention and is used for the purpose of retaining the support means 24 and 38 respectively to the undercarriage of the body member 60.

A draw bar 66 is rigidly secured to the underplate 68 of a multi-disc turning means. A king bolt 70 extends through the said under plate and also an upper plate 72 for the purpose of providing turning means for the forward wheels 74 utilized in this particular embodiment of the present invention. Of course, a suitable axle 76 along with strengthening members 78 may be supplied for suspending the said wheel 74 in the desired operative position. A tie rod 80 is secured to the relatively stationary upper plate or disc 72 for the purpose of suspending a pair of cam support means or links 82.

Figure 5:
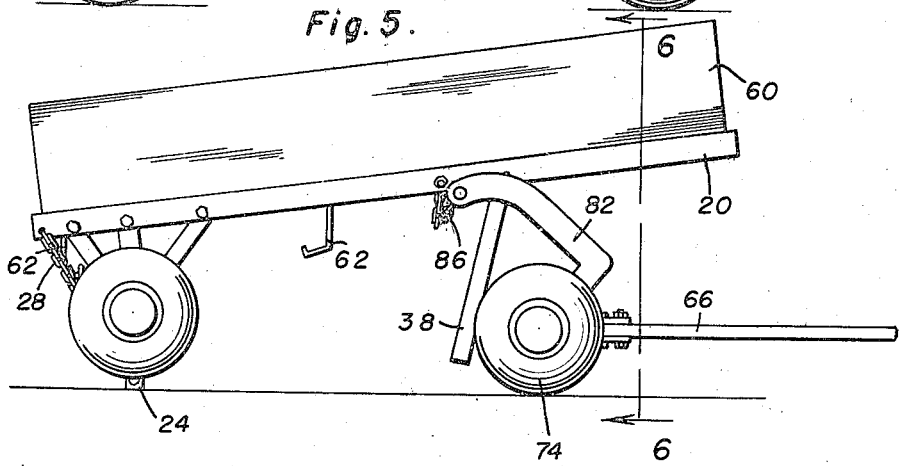
Figure 5 is a side view of the invention disclosed in Figure 4 showing a second operational position thereof.
Figure 6:
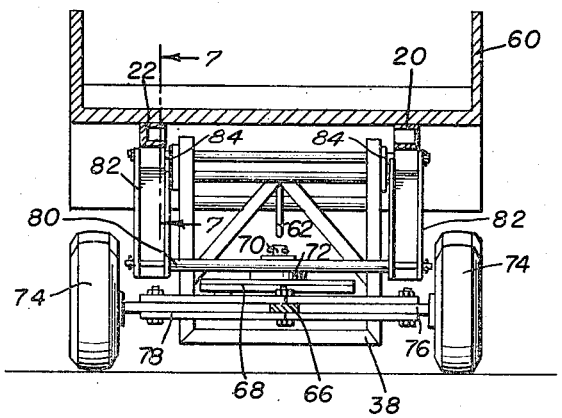
Figure 6 is a sectional view taken substantially on the line 6—6 of Figure 5 and in the direction of the arrows.
Figure 7:
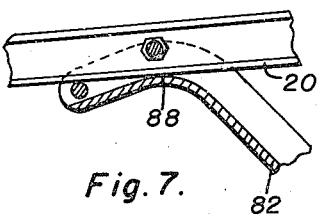
Figure 7 is an enlarged sectional view showing the cam means forming part of the present invention and taken on the line 7—7 of Figure 6 and in the direction of the arrows.

These links 82 may be viewed in Figure 5 wherein it is noted that they are pivoted to a pair of pitman rods 84 connected between the terminal portion of the said links 82 and the channel members 20 and 22 respectively. Chain means 86 also extend between the terminal portion of the said links 82 and a suitable point on the channel members 20 and 22.

In operation, the support means 38 and 24 are dropped to the ground or other tractor supporting surface and the trailer may be lifted as described in the operation set forth pertinent to the first embodiment of this invention. As the trailer is lifted the same may ride on the cam surfaces 88 provided in the links 82.

Going now to the third embodiment of this invention, reference is made to the single Figure 8. Here there is disclosed a relatively small trailer body member 90 wherein the channel members 20 and 22 (unshown) are also supplied. Suspension means for the wheel is provided and of course, in this embodiment it may be found preferable to utilize conventional leaf springs. The support means 24 along with the chain means 28 are employed in association with the rear wheel and the hook means 62 pertinent thereto are utilized for the purpose of retaining the support means 24 and 38 adjacent the under-carriage of the body member 90.

It will be noted that there is illustrated a conventional automobile which is to be employed as a tractor in this embodiment of the invention. Accordingly, a conventional hitch 92 is secured to the rear bumper of the tractor 10 and the connecting links 94 extending between the trailer and tractor are especially adapted for use in conjunction with the relatively light construction of the hitch 92. It will be noted that the connecting links 94 have a right angular bend therein thereby rendering them similar to bell cranks. Of course, the links 94 may be pivoted to a common pivot pin 96 also utilized for the purpose of pivoting the forward support 38. The opposite ends of the bell crank links 94 are pivoted to the upper portion of the hitch 92 by means of a suitable pivot pin 98 which is conventional in nature. The operation of this form of the present invention is deemed apparent from an inspection of Figure 8 and also from the description of the operation of the first form explained herewith.

Reference is now made in Figures 9 and 10 wherein the final embodiment of the present invention is illustrated. It will be noted that this last embodiment of the present invention is almost identical to that described as the second embodiment. The same truck body member 60 is employed along with the rear support 24, front support 38, chain limiting means 28 and hook means 62. A slightly different type of draw bar is utilized herewith and is generally indicated at 100. This draw bar may be supplied with an extension 102 wherein a pin 104 may be employed for securing the said draw bar to a conventional draw bar 106 of a farm tractor.

The distinguishing feature in this embodiment of the present invention is disclosed as the connecting links 108, differentiating from the connecting links 82 of the second embodiment of the invention. It will be noted that the cam surfaces 88 are obviated and the connecting links 108 are pivoted directly to a common pin 110 also utilized in pivoting the forward support means 38. In this embodiment of the present invention substantially the same results are produced as that in the second embodiment yet the construction is more inexpensive and simple.

It will be noted at this point that it is within the purview of this invention to supply cable actuated latches in place of the hooks 62 if so desired. Further, the cable means illustrated in the first embodiment of the present invention may be also employed with any of the other illustrated embodiments if it is desired to produce the effect attained by utility of the cable means.

Having set forth the preferred embodiments of the present invention in detail, it is apparent that various changes and modifications may be made of the inventive concept without departing from the spirit of the invention. Accordingly, limitation is sought only in accordance with the scope of the following claims.

Having described the invention, what is claimed as new is:

1. Lifting means for use with a trailer having wheels, a chassis and an axle housing associated therewith, a frame pivoted to said housing, means for retaining said frame in a selected pivoted position, a second frame pivoted to said chassis engageable with a trailer supporting surface, means pivoted to said trailer for connecting the trailer to a tractor, flexible means associated with said trailer and said second frame for limiting the travel of said second frame, an arm pivoted to said chassis, locking means on said arm and said second frame for retaining said second frame in a predetermined position.

2. Lifting means for use with a trailer having wheels, a chassis and an axle housing associated therewith, a first frame pivoted to said housing, means for retaining said first frame in a selected pivoted position, a second frame pivoted to said chassis engageable with a trailer supporting surface, means pivoted to said trailer for connecting the trailer to a tractor, means for returning at least one of said frames to the normally inoperative position, flexible means secured to said trailer and said first frame for limiting the travel thereof, locking means associated with said chassis and engaging said second frame for retaining said second frame in a predetermined position.

3. Lifting means comprising a trailer having wheels and an axle housing associated therewith, a frame pivoted to said housing, means for retaining said frame in a selected pivoted position, a second frame pivoted to said trailer engageable with a trailer supporting surface, means pivoted to said trailer for connecting the trailer to a tractor, said last means including cam means engageable with said trailer for lifting the said trailer.

4. Lifting means comprising a trailer having wheels and an axle housing associated therewith, a frame pivoted to said housing, means for retaining said frame in a selected pivoted position, a second frame pivoted to said trailer engageable with a trailer supporting surface, means pivoted to said trailer for connecting the trailer to a tractor, said last means including cam means engageable with said trailer for lifting the said trailer, said last means including arms pivoted to said trailer having cam surfaces engageable with said trailer.

5. Lifting means comprising a trailer having wheels and an axle housing associated therewith, a frame pivoted to said housing, means for retaining said frame in a selected pivoted position, a second frame pivoted to said trailer engageable with a trailer supporting surface, means pivoted to said trailer for connecting the trailer to a tractor, said last means including cam means engageable with said trailer for lifting the said trailer, said last means including arms pivoted to said trailer having cam surfaces engageable with said trailer, and flexible means secured to said arms and said trailer for limiting the travel of said arms.

6. Lifting means comprising a trailer having wheels and an axle housing associated therewith, a frame pivoted to said housing, means for retaining said frame in a selected pivoted position, a second frame pivoted to said trailer engageable with a trailer supporting surface, means pivoted to said trailer for connecting the trailer to a tractor, means including cam means engageable with said trailer for lifting the said trailer, said last means including arms pivoted to said trailer having cam surfaces engageable with said trailer, means on said trailer for retaining the said arms in the inoperative position.

7. Lifting means comprising a trailer having wheels and an axle housing associated therewith, a frame pivoted to said housing, means for retaining said frame in a selected pivoted position, a second frame pivoted to said trailer engageable with a trailer supporting surface, means pivoted to said trailer for connecting the trailer to a tractor, said last means including cam means engageable with said trailer for lifting the said trailer, said last means including arms pivoted to said trailer having cam surfaces engageable with said trailer, latch means secured to said trailer lockingly engageable with said arms for retaining said arms in a predetermined position.

PAUL P. LUTZ.

REFERENCES CITED

The following references are of record in the file of this patent:

UNITED STATES PATENTS

| Number | Name | Date |
| --- | --- | --- |
| 1,356,697 | Crane | Oct. 26, 1920 |
| 2,027,098 | Helms | Jan. 7, 1936 |
| 2,190,489 | Sellinger | Feb. 13, 1940 |